Aug. 4, 1931.  H. H. BAILEY ET AL  1,817,473

HOSE CLAMP

Filed Oct. 31, 1930

INVENTOR
Henry H. Bailey
BY and Jack Lee Thomas

ATTORNEY

Patented Aug. 4, 1931

1,817,473

UNITED STATES PATENT OFFICE

HENRY H. BAILEY AND JACK LEE THOMAS, OF OKLAHOMA CITY, OKLAHOMA, ASSIGNORS TO MECHANICAL ROYALTIES CORPORATION, OF OKLAHOMA CITY, OKLAHOMA, A CORPORATION OF OKLAHOMA

HOSE CLAMP

Application filed October 31, 1930. Serial No. 492,468.

Our invention relates to hose clamps and more particularly to a device of that character adapted to connect the ends of hose and conduit fittings conducting fluid under high pressures; the principal object of our invention being to provide a clamp formed of sections and including means for insuring a uniform clamping action of the sections around the entire periphery of the hose.

In accomplishing this and other objects of our invention we have provided improved details of structure the preferred form of which is illustrated in the accompanying drawings, wherein.

Figure 1:
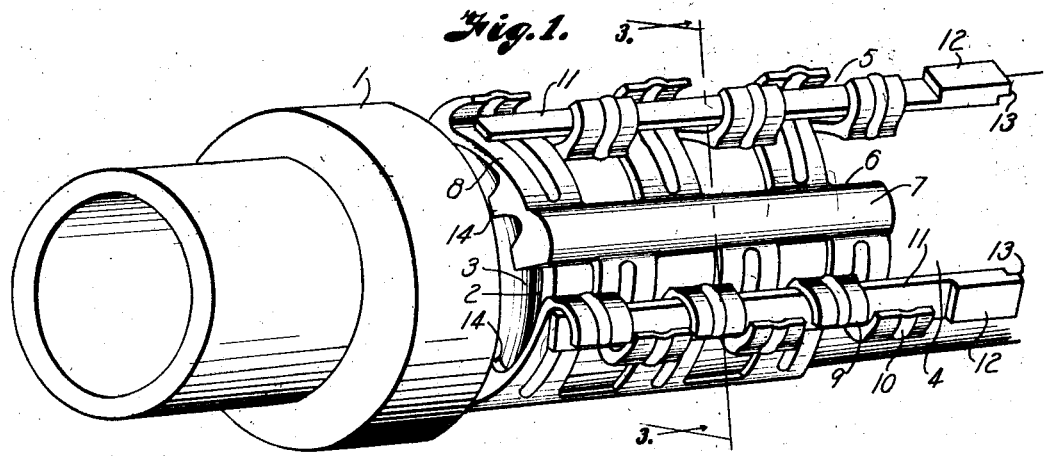
Fig. 1 is a perspective view of a conductor fitting and of a hose attached thereto by a clamp embodying our invention.
Figure 2:
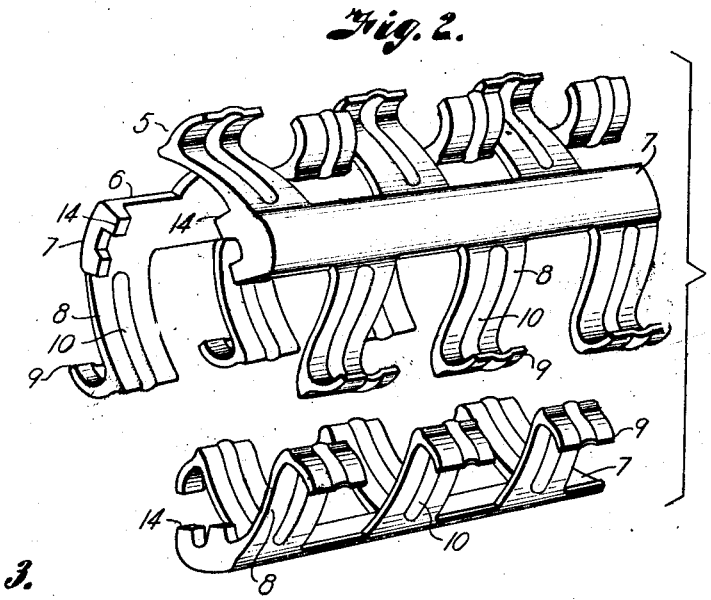
Fig. 2 is a perspective view of the clamp sections in disassembled but related condition.
Figure 3:
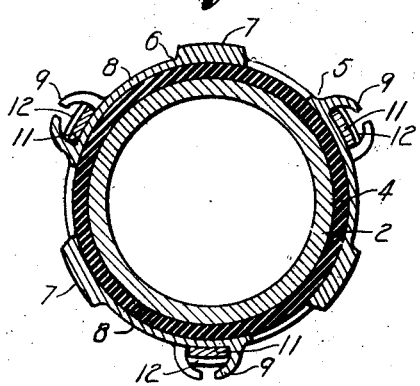
Fig. 3 is a cross section on the line 3—3 Fig. 1.

Referring more in detail to the drawings:

1 designates a conduit fitting having a nipple 2 provided with a circumferential stop flange 3. A flexible hose 4 slidably engaging the nipple is adapted to abut the stop flange and is maintained securely on the nipple by a clamp assembly 5 embodying my invention.

The clamp assembly preferably includes three individual sections 6, each section having a longitudinal body or spine 7 preferably formed sufficiently heavy to prevent bending thereof.

Extending outwardly from the spine on opposite sides thereof and in staggered relation to each other are a series of ribs 8 terminating at their outer ends in hooks 9 and having longitudinal indentations 10 for strengthening the ribs. Due to the staggered arrangement of the ribs the hook portions of one section are adapted to be interposed between the hooks of an adjacent section, thereby forming longitudinal guides for receiving wedge members 11 serving to contract the sections firmly around a hose.

As shown in Fig. 1, each of the wedge members tapers gradually to a narrow end and is provided on its wide end with a head portion 12 having a striking face 13 on its extreme outer end which is upset from the wedge member to facilitate driving thereof into its respective groove.

Longitudinal sliding movement of the sections on the hose is prevented by providing an inwardly directed lug 14 on the inner end of each spine or body portion, the lugs seating against the flange 3 of the conduit fitting when the sections are mounted in functional position on a hose.

In assembling cooperating sections on the hose to firmly secure said hose to a conduit fitting, the sections are assembled on the fitting and hose with the hook portions of one section interposed between the spaced hooks of adjacent sections, and wedge members are inserted in each of the grooves produced thereby.

The wedge members are then driven into the grooves until the sections fit firmly on the outer surface of the hose and leakage of fluid passing through the hose and fitting is effectively prevented, due to the large amount of interlapping relation between the separate sections, thus insuring a uniform clamping action of the sections around the entire periphery of the hose.

What we claim and desire to secure by Letters Patent is:

1. A hose clamp including cooperating sections, each section having a longitudinal spine, ribs extending in staggered relation from opposite sides of the spine and forming slots for receiving the ribs of adjacent sections, and means for urging the sections into contracted relation with each other.

2. A hose clamp including cooperating sections, each section having a longitudinal spine, ribs extending in staggered relation from opposite sides of the spine and terminating in hooks, and wedging means adapted to cooperate with said hooks for urging the sections into contracted relation with each other.

3. A hose clamp including cooperating sections, each section having a longitudinal spine, ribs extending in staggered relation from opposite sides of the spine and terminating in hooks, the hooks of one section being interposed between the hooks of an adjacent section to form a longitudinal guide, and wedge members in said guides for urging the sections into contracted relation with each other.

4. A hose clamp including cooperating sections, each section having a longitudinal spine bent inwardly at one end to form a lug, ribs extending in staggered relation from opposite sides of the spine and terminating in hooks, the hooks of one section being interposed between the hooks of an adjacent section to form a longitudinal guide, and wedge members in said guides for urging the sections into contracted relation with each other.

5. A hose clamp including cooperating sections, each section having a rigid longitudinal spine, ribs extending in staggered relation from opposite sides of the spine and having longitudinal indentations, hooks on the outer ends of the ribs, the hooks of one section being interposed between the hooks of an adjacent section to form a longitudinal groove, and wedge members slidable in said grooves for urging the sections into contracted relation with each other.

In testimony whereof we affix our signatures.

HENRY H. BAILEY.
JACK LEE THOMAS.